J. A. MANSON.
WEIGHING MACHINE.
APPLICATION FILED OCT. 5, 1910.

995,021.

Patented June 13, 1911.

3 SHEETS—SHEET 1.

WITNESSES:
A. C. Fairbanks,
J. M. Davenport

INVENTOR.
James A. Manson,
BY
Webster & Co.,
ATTORNEYS.

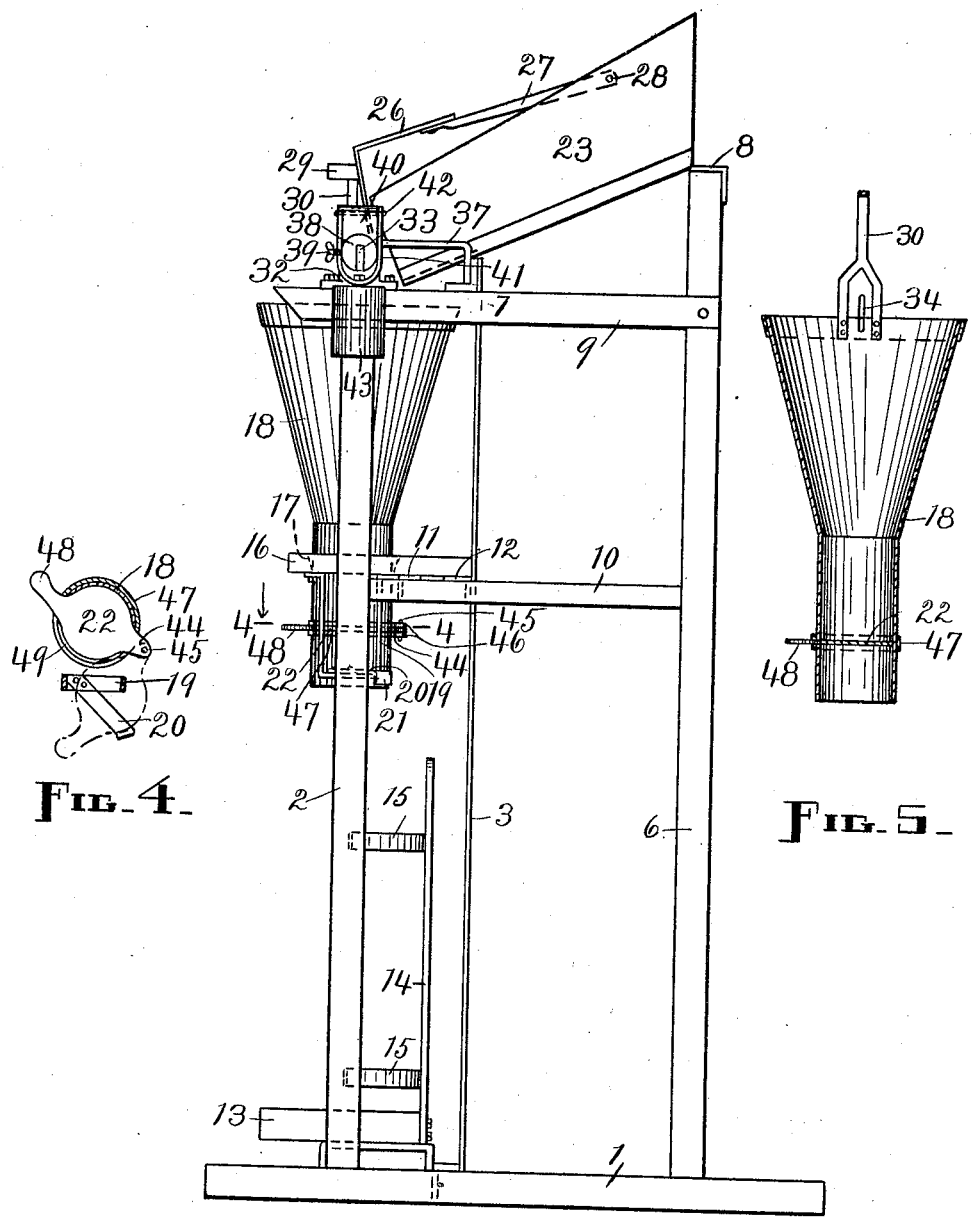

UNITED STATES PATENT OFFICE.

JAMES A. MANSON, OF SPRINGFIELD, MASSACHUSETTS.

WEIGHING-MACHINE.

995,021.  
Specification of Letters Patent.   Patented June 13, 1911.

Application filed October 5, 1910.  Serial No. 585,404.

*To all whom it may concern:*

Be it known that I, JAMES A. MANSON, a citizen of the United States of America, residing at Springfield, in the county of Hampden and State of Massachusetts, have invented a new and useful Weighing-Machine, of which the following is a specification.

My invention relates to improvements in machines for automatically weighing coal, grain, and other commodities of a more or less similar character, which are sold in packages of uniform weight, and consists of certain peculiar balancing or scale mechanism, and a suitable feeding or loading device or appliance, together with such auxiliary and subsidiary parts and members as may be essential in order to render the machine complete and serviceable, all as hereinafter set forth.

The object of my invention is to produce a comparatively simple and inexpensive yet strong and durable machine which is adapted to weigh automatically any given amount within the capacity of the machine, is self feeding, is accurate and reliable, and is withal highly practicable and efficient.

Other objects will appear in the course of the following description.

This machine is especially useful for bagging coal, since with it practically all of the work is done automatically, so that there is a large saving in time, labor and expense, but said machine is by no means limited to such use, since it is capable of handling to advantage many if not most kinds of substances that are of a granular or pulverulent character, such as sugar, corn, wheat, etc., provided weight is a factor in the dividing or apportioning process.

By "bagging coal" is meant the placing in tough paper bags of some particular number of pounds of coal for small consumers, say twenty pounds in a bag.

I attain the objects and secure the advantages, hereinbefore referred to, by the means and mechanism illustrated in the accompanying drawing, in which—

Figure 1:
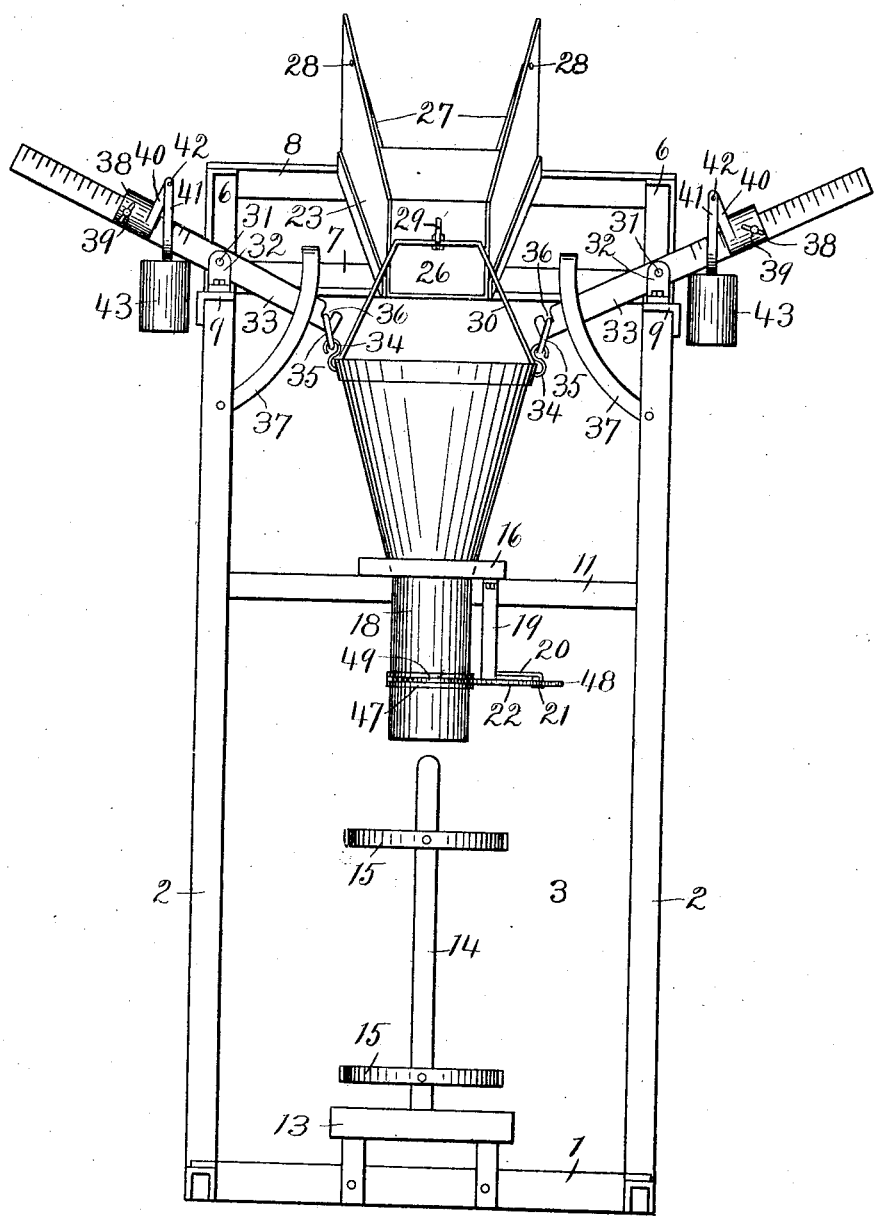
Figure 2:
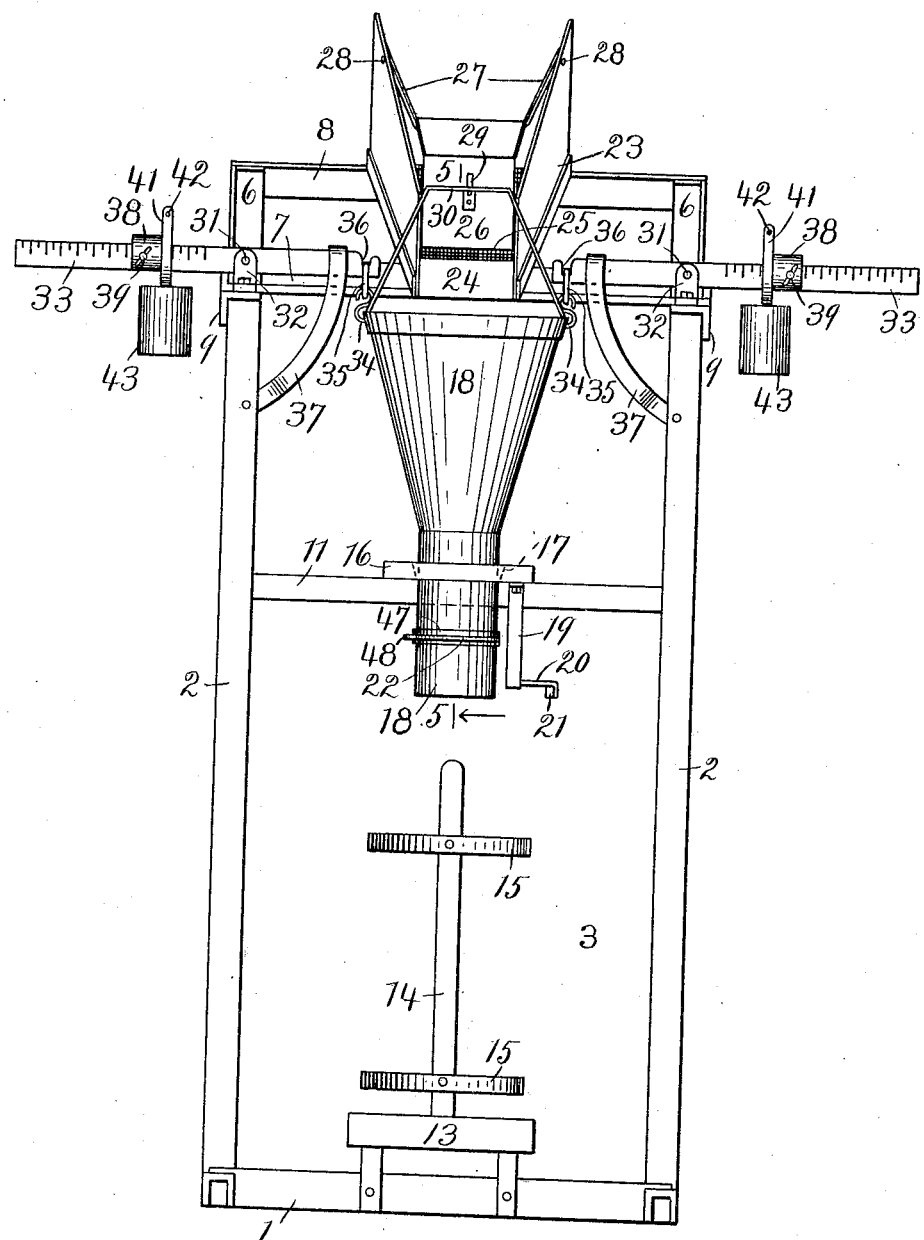

Figure 1 is a front elevation of a practical embodiment of my invention, the bucket being represented in its lowest position with the other movable parts or members disposed accordingly; Fig. 2, a front elevation of said machine, showing said bucket in its highest position and the other movable members correspondingly disposed; Fig. 3, a side elevation of the machine, with the same arrangement of movable parts as in the preceding view; Fig. 4, a sectional detail taken on lines 4—4, looking in the direction of the associated arrow, in Fig. 3, and, Fig. 5, a sectional detail taken on lines 5—5, looking in the direction of the associated arrow, in Fig. 2.

Similar figures refer to similar parts throughout the several views.

A suitable supporting frame of wood, steel, or other suitable material is provided for this machine, the other elements of the machine being mounted on and carried by such frame. In the present instance the frame comprises a base 1, four uprights 2 and 6 arranged in pairs, the rear pair, 6, being taller than the front pair, 2, a cross piece 8 connecting the two uprights 6 at the top, two side pieces 9 at the tops of the uprights 2 connecting said uprights with the uprights 6, a cross piece 7 connecting said side pieces intermediate of their ends, a side piece 10 intermediate of said base and each of said first mentioned side pieces, and two cross pieces 11 and 12 between the two side pieces 10 in front of a vertical plane common to the uprights 3.

Mounted on the base 1, between the uprights 2, is a platform 13 provided with a bag support 14 for the bags while being filled. The support 14 has two forwardly-curved arms 15 to receive a bag.

Mounted between the supports 2 on the cross pieces 11 and 12 is a plate 16 having an opening 17 therethrough to receive the spout which constitutes the lower cylindrical portion of a funnel-shaped bucket 18. The plate 16 constitutes a combination guide and rest for the bucket 18. Depending from the plate 16, at the right of the aforesaid cylindrical portion or spout of the bucket 18, is a bracket 19 which has a horizontal arm 20 that extends to the right and rearwardly from said bracket and is turned down at its free end to form a lug 21. The arm 20 and its lug 21 constitute stops for a horizontal diaphragm, valve, or shutter 22 with which the bucket 18 is provided, as will be explained presently.

An inclined chute 23 is mounted on the cross pieces 7 and 8, in the center, and opens at its lower front end over the bucket 18. The chute 23 receives the coal, it being assumed that this machine is intended to handle that commodity, from any suitable source and in any suitable manner, usually, however, by means of another chute (not shown) connected with the rear end of said chute 23 and leading thereto from an accumulation at a higher level or from an elevator. As shown at 24 and 25, respectively, the front portion of the floor of the chute 23 is imperforate, while the rest of said floor is perforated. The perforated portion 25 extends over the space between the uprights 3 and 6, and this permits the dust and fine particles to escape from the coal, as the coal slides down the chute 23 and before it arrives over the bucket 18, such dust and particles dropping through the perforations and down behind a vertical plate or partition 3 which protects the weighing mechanism therefrom. The partition 3 is secured at the bottom to the base 1 and at the top to the cross piece 7.

An angular door or shutter 26 is provided with which to open and close the front or discharge end of the chute 23, such shutter having two rearwardly-extending arms 27 which are pivoted at their rear ends to the sides of said chute at 28—28. This shutter is heavy enough to close by gravity and cut off the advance of the coal. On the front of the shutter 26 is a lug 29 that projects into the path of a lifter 30. The lifter 30 is, in the present case, an angular member somewhat similar to the bail of an ordinary bucket and is securely fastened at its ends to the bucket 18.

Pivotally mounted at 31—31 to suitable brackets 32—32 are two scale beams 33, said brackets being secured to the side pieces 9 directly over the uprights 2. These scale beams extend both ways from the side pieces 9, that is, to the right and left thereof, and the bucket 18 is suspended from the inner or adjacent terminals of said beams by means of hooks 34 and links 35, the former being fastened to said bucket on opposite sides near the top and swung from said links, and the latter being swung from notched portions 36—36 of said beam terminals. The upward movement of the inner terminal portions of the beams 33, and consequently of the bucket 18, is limited by stops 37—37 in the form of bent members which are fastened at their lower ends to the uprights 2, extend upwardly and rearwardly over said inner terminal portions and then downwardly, and are fastened by the downwardly-extending parts just mentioned to the cross pieces 8. Preferably the stops 37 are arranged to check the scale beams when they reach the horizontal position. Suitable scales may be marked or otherwise indicated on the beams 33, the same being on the outer terminal portions of said beams, beyond or outside of the frame of the machine.

Each scale beam 33 is provided on its outer terminal portion with a slide 38 which has a set-screw 39 tapped into it and adapted to bear against the beam and so secure said slide rigidly thereto at whatever point the slide may be located or adjusted. Rising from the inner end of each slide 38 is a lug 40, and to the top of this lug or yoke 41 is pivoted at 42. A weight 43 is attached to the bottom of each yoke 41. Thus it will be seen that, by loosening the thumb-screws 39, moving the slides 38 nearer to the brackets 32 and retightening said thumb-screws, less coal in the bucket 18 will be required to tip the beams, and by adjusting said slides in the opposite directions so as to locate them nearer the free ends of said beams, more coal will be required. The same results may also be obtained by substituting lighter weights for the weights 43, on the one hand, and heavier weights, on the other hand. In all this there is nothing new so far as the operation of the balancing members is concerned, but a most important advantage and one which is believed to be novel is obtained as the result of mounting or suspending the weights so that they swing freely from points above the inner ends of the slides 38, since such points must approach the vertical planes in which the axes of the pivots 31 are situated in such a manner as to accelerate the approach to such planes of the centers of gravity of said weights and to so change the relationship of the parts that the effect of the weights is lessened after the loading operation is finished and the bucket begins to descend and tip the beams, to the end that said bucket is permitted to make, if not actually aided in making, its complete descent. With weights suspended from the bottoms of slides in the old way, the weighing operation can take place, but in many cases the full descent of the loaded bucket does not occur because of the impediment of the weights, while with the weights suspended so that they approach the beam fulcrums, as herein shown and described, no such difficulty is experienced, all of which I have fully demonstrated. In my machine the force exerted by the weights is very much decreased as the beams continue to tip, and the more they tip the greater the decrease, consequently my loaded bucket is relieved more and more from the effect of the weights as it descends lower and lower, and is thus able to complete its descent at practically the same rate of speed with which it began to descend. This is a very valuable feature in a machine of this kind, for the reason that much time and trouble are saved which would otherwise be expended in drawing the loaded bucket to discharging position.

By locating the pivots 42 directly above the inner ends of the slides 38, the usual and desired initial balancing effect is obtained when the beams 33 are in their horizontal positions, which would not be the case if such pivots were offset from said ends inwardly; nor, in the latter event, could said slides be adjusted as near to the beam fulcrums, although the nearer approach to said fulcrums, when the beams are tipped, and the consequent quicker relief, as hereinbefore explained, might be brought about.

As previously noted, the bucket 18 is equipped with the shutter 22. This shutter is in the spout of the bucket 18 and has a lug 44 that extends from one edge thereof and is pivoted at 45 to and between two lugs 46 which are securely attached to said spout by means of a band 47 which encircles said spout a little distance above its base, and said shutter has a handle 48 that extends from the edge opposite said lug 44. Slots are cut in the bucket 18 and in the band 47, as shown at 49, in Figs. 3 and 5 to enable the shutter 22 to be swung open. The band 47 is below the plate 16. The position of the stop members 20 and 21 and the construction and arrangement of the bucket and its shutter are such that, when said bucket is in its lowest position with its flaring portion at rest on the plate 16 and said shutter is swung outward on the pivot 45 through the slots 49, the shutter passes under said member 20 and strikes against said member 21. The member or lug 21 thus limits the outward movement of the shutter 22, but does not stop said shutter until the latter has passed entirely beyond the bucket passageway, so as to leave such passageway clear for the escape of the contents of the bucket; and the member or arm 20 prevents said bucket from rising when freed from its load as it otherwise would do under the influence of the scale members or weights, until the shutter is moved from beneath said arm in closing. When swung into the bucket 18 as far as it will go the shutter 22 completely closes the passageway therethrough and serves as a bottom for the bucket upon which the load is received and supported prior to its discharge.

Starting with the parts disposed, as represented in Fig. 5, and assuming that the slides 38 have been set so that the machine will weigh the required amount, the complete operation of said machine is as follows: The handle 48 is grasped and the shutter 22 is closed. As soon as the shutter 22 passes from beneath the stop arm 20 the bucket 18 rises, being carried upward by the beams 33 which are now swung by their weights into contact with the stops 37 which check them when they are in alinement with each other. The lifter 30 on the rising bucket 18 encounters the lug 29 and raises the shutter 26, swinging the latter upwardly on the pivots 28, so as to enable said bucket to be loaded with coal from the chute 23. The parts are now disposed as indicated in Figs. 2 and 3. The coal runs from the chute 23 beneath the now open shutter 26 into the bucket 18, and the latter descends under its load overbalancing and tilting the scale beams 33, until said bucket comes to rest on the plate 18. The descent of the loaded bucket onto the plate 16 is insured because, as herein previously explained at some length, the beam loads, represented by the weights 43, move nearer to the beam fulcrums, represented by the pivots 31, and relieve the beams more and more as said bucket approaches its lowest position and its power becomes less, such power decreasing as the pivotal connections at the notches 36 approach the vertical planes in which the axes of said pivots are located, just as the force exerted by said weights decreases as their pivotal points approach said planes. The descending bucket removes the lifter 30 from supporting relation to the lug 29, and the shutter 26 immediately drops into its closed position and so prevents more coal from passing from the chute 23 into said bucket. An expanded bag (not shown) having been placed on the platform 13, against the support 14 and the arms 15, the lower terminal of the bucket 18, below the band 47, enters the open top of such bag, when said bucket descends, and the shutter 22 is then opened by means of the handle 48 to release the coal in the bucket and allow it to enter the bag. The complete operation thus set forth is repeated as often as desired, and each time a bag is filled, the filled bag being replaced by an empty bag at every cycle of the machine. The aforesaid operation is performed quite rapidly, the work being done very much more expeditiously than it is possible to do it entirely by hand in the old way.

Such modifications and changes, in the construction and arrangement of some or all of the parts of this machine, as would naturally occur to one skilled in the art, to which this invention appertains, are to be considered as belonging to said invention, provided they can fairly be said to fall within the scope of my claims.

What I claim as my invention, and desire to secure by Letters Patent, is—

1. The combination, in a weighing machine, with a suitable upright supporting frame, and a partition erected in said frame between the front and back thereof, of an inclined chute mounted on said frame over said partition and provided with a foraminous bottom with the perforations opening behind said partition, oppositely-disposed scale beams pivotally mounted on such frame, weights on such beams, and a bucket suspended from the adjacent terminals of such beams in front of said partition and beneath the discharge end of said chute.

2. The combination, in a weighing machine, with a suitable support, and an inclined chute mounted on such support, of oppositely-disposed independent scale beams pivotally mounted on such support, weights on such beams, a bucket suspended from adjacent terminals of such beams beneath the discharge end of said chute, and stops for said beams arranged in the paths of their inner terminals to limit the upward movement of such inner or adjacent terminal portions with that of said bucket.

3. The combination, in a weighing machine, with a suitable support, and an inclined chute mounted on such support and provided with a shutter, of oppositely-disposed independent scale beams pivotally mounted on such support, weights on such beams, a bucket suspended from the adjacent terminals of such beams beneath the discharge end of said chute, and means carried by said bucket to automatically open and close said shutter as said bucket rises and falls.

4. The combination, in a weighing machine, with a suitable support provided with a combination guide and rest for a bucket, and a chute mounted on such support, of oppositely-disposed scale beams pivotally mounted on such support, weights on such beams, and a bucket suspended from the adjacent terminals of such beams in operative relation to said chute and to said combination guide and rest.

5. The combination, in a weighing machine, with a suitable support provided with a stop, and a chute mounted on such support, of oppositely-disposed scale beams pivotally mounted on such support, weights on such beams, and a bucket suspended from the adjacent terminals of such beams in operative relation to said chute, said bucket being provided with a member adapted to be moved into engagement with said stop to prevent the bucket from rising.

6. The combination, in a weighing machine, with a suitable support, of oppositely-disposed scale beams pivotally mounted on such support, a load-receiving member supported by the inner terminals of such beams, weights for such beams, and automatically-moving weight-supporting means carried by such beams, but having individual and independent movement which enables them to advance said weights toward the load, when said beams tip in weighing, and increase the ratio of decrease in the force exerted by said weights over the decrease in the power of said load, such means being free to move at all times.

7. The combination, in a weighing machine, with a suitable support, and a chute mounted on such support, of oppositely-disposed scale beams pivotally mounted on such support, a bucket suspended from the inner terminals of such beams in operative relation to said chute, weights for such beams, and automatically-moving weight-supporting means carried by such beams, but having individual and independent movement which enables them to advance said weights toward the load (represented by said bucket and its contents), when said beams tip in weighing, and increase the ratio of decrease in the force exerted by said weights over the decrease in the power of said load, such means being free to move at all times.

8. The combination, in a weighing machine, with a suitable support, of oppositely-disposed scale beams pivotally mounted on such support, slidingly-adjustable weight-supporting members on such beams, freely-swinging depending weights connected with said members at points which extend inwardly from the inner ends of said members when said beams are tipped in weighing, and a bucket supported by the inner terminals of said beams.

9. The combination, in a weighing machine, with a suitable support, of oppositely-disposed scale beams pivotally mounted on such support, slidingly-adjustable weight-supporting members on such beams, such members having projections above their inner terminals, freely-swinging yokes pivotally connected with said projections at the upper ends of the same, weights attached to said yokes at their bases, and a bucket supported by the inner terminals of said beams.

10. The combination, in a weighing machine, with a suitable support, of oppositely-disposed scale beams pivotally mounted on such support, slides on such beams, such slides having lugs rising from their inner terminals, freely-swinging yokes pivotally connected with said lugs, weights attached to said yokes at their bases, means to fasten said slides in place on said beams, and a bucket suspended from the inner terminals of said beams.

11. The combination, in a weighing machine, with a suitable support, of scale members mounted on such support, a bucket suspended from such members, a rest attached to said support to receive said bucket when it arrives in its lowest position, and engaging means for said bucket to retain the same in such position.

12. The combination, in a weighing machine, with a suitable support, of scale members mounted on such support, a bucket suspended from such members and provided with a movable shutter, a rest attached to said support to receive said bucket when it arrives in its lowest position, and a stop arranged above the horizontal plane of said shutter when in its low position, the arrangement of parts being such that when said shutter is opened in said low position it enters beneath said stop and so retains said bucket on said rest.

13. The combination, in a weighing machine, with a suitable support, of scale members mounted on such support, a bucket suspended from such members and provided with a movable shutter, a rest attached to said support to receive said bucket when it arrives in its lowest position, and a stop arm having a stop lug, said arm being above the horizontal plane of said shutter when in its low position so that said shutter then when opened enters beneath said arm to retain said bucket on said rest, and said lug being in the path of said shutter to limit the movement of the same in opening beneath the arm.

14. The combination, in a weighing machine, of a suitable support, scale members mounted on said support, a bucket suspended from said members, a bucket-receiving platform under said bucket, and a chute opening over said bucket, said chute being provided with a shutter operated by the bucket, and the latter being provided with a shutter to release the contents therein.

15. The combination, in a weighing machine, with a suitable support, and the weighing and loading mechanism, of a funnel-shaped bucket provided in its lower portion or spout with a movable diaphragmal shutter, and a guide attached to said support for said spout.

JAMES A. MANSON.

Witnesses:
F. A. CUTTER,
A. C. FAIRBANKS.